(12) United States Patent
Aratani (10) Patent No.: US 6,572,957 B1
(45) Date of Patent: Jun. 3, 2003

(54) MAGNETO-OPTICAL RECORDING MEDIUM WITH FOUR LAYERED RECORDING LAYER HAVING SPECIFIC RELATIVE MAGNETIC ANISOTROPY VALUES

(75) Inventor: Katsuhisa Aratani, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/601,092

(22) PCT Filed: Jan. 29, 1999

(86) PCT No.: PCT/JP99/00402

§ 371 (c)(1),
(2), (4) Date: Mar. 23, 2001

(87) PCT Pub. No.: WO99/39342

PCT Pub. Date: Aug. 5, 1999

(30) Foreign Application Priority Data

Jan. 30, 1998 (JP) ............................................. 10-020040

(51) Int. Cl.⁷ ............................................ G11B 11/105
(52) U.S. Cl. ................................ 428/212; 428/94 MM; 369/13.06
(58) Field of Search ................................. 428/611, 655, 428/694 MM, 694 TM, 212, 668; 369/13.06

(56) References Cited

U.S. PATENT DOCUMENTS 6,125,083 A * 9/2000 Nishimura et al. ........... 369/13
6,128,254 A * 10/2000 Matsumoto et al. .......... 369/13

FOREIGN PATENT DOCUMENTS

| JP | 06-290496 | | 10/1994 |
| JP | 07-244877 A | * | 9/1995 |
| JP | 08-249737 | | 9/1996 |
| JP | 10-092031 | | 4/1998 |
| JP | 11-086372 | | 3/1999 |

OTHER PUBLICATIONS

Derwent Abstract Translation of JP–07–244877–A (Clipped Image No. JP407244877A).*

* cited by examiner

Primary Examiner—Stevan A. Resan
Assistant Examiner—Kevin M. Bernatz
(74) Attorney, Agent, or Firm—Sonnenschein, Nath & Rosenthal (57) ABSTRACT

A magneto-optical recording medium incorporates a recording layer constituted by a multi-layered magnetic film composed of at least three magnetic layers. Domain walls of the magnetic layer adjacent to the portion irradiated with reproducing light are moved toward the center of the spot in a forward portion in a direction, in which the reproducing light spot is moved, so that a recording magnetic domain is enlarged, and movement of the domain walls of the magnetic layer adjacent to the portion irradiated with reproducing light is inhibited in a rear portion in the direction in which the reproducing light spot is moved. To inhibit movement of the domain walls of the magnetic layer adjacent to the portion irradiated with reproducing light, insertion of a magnetic layer having a predetermined magnetic characteristic into a space between a displacement layer and a switch layer is required.

4 Claims, 7 Drawing Sheets

MAGNETO-OPTICAL RECORDING MEDIUM WITH FOUR LAYERED RECORDING LAYER HAVING SPECIFIC RELATIVE MAGNETIC ANISOTROPY VALUES

BACKGROUND OF THE INVENTION

1. Field of the Invention

The present invention relates to a magneto-optical recording medium for reproducing a signal by enlarging a magnetic domain by moving domain walls, and more particularly to a technique for canceling a ghost signal.

2. Description of the Related Art

In recent years, a magneto-optical reproducing method has been suggested which employs a triple-layered magnetic film consisting of a displacement layer, a switch layer and a memory layer. Thus, movement of domain walls of the displacement layer takes place when the temperature of the film has been raised to a level not lower than the Curie temperature is used. This effectively enlarges the size of the recording magnetic domain so as to intensify a reproduction carrier signal.

The foregoing method called, "DWDD (Domain Wall Displacement Detection)", is able to reproduce an intense signal even from a fine recording magnetic domain, the period of which is not longer than the optical limit of separative power of reproduction light. Therefore, the foregoing method is one of advantageous methods which is capable of raising the density without a necessity of changing the wavelength of light and the numerical aperture NA of an objective lens.

The DWDD, however, suffers from a multiplicity of problems which must be overcome. For example, behavior is displayed such that when a signal having a period longer than a certain period is reproduced, a signal corresponding to the recording magnetic domain of the signal appears. Then, the signal disappears temporarily, and then the signal again appears.

The foregoing phenomenon is called "ghost". It is difficult to determine whether the signal allowed to appear is the ghost signal or the signal corresponding to a next recording magnetic domain. Moreover, there arises a problem in that the noise-level is raised in the vicinity of the period of the recording magnetic domain in which appearance of the ghost signal starts. As a result, there arises a problem in that the recording density cannot satisfactorily be raised.

SUMMARY OF THE INVENTION

An object of the present invention is to prevent a ghost phenomenon experienced with a DWDD magneto-optical recording medium.

The inventors of the present invention have performed a variety of studies to achieve the above-mentioned object. A magneto-optical recording medium according to the present invention has been found in accordance with results of the studies. The principle lies in preventing unnecessary movement of domain walls of the displacement layer.

The magneto-optical recording medium according to the present invention comprises: a recording layer constituted by a multi-layered magnetic film composed of at least three magnetic layers, wherein domain walls of the magnetic layer adjacent to the portion irradiated with reproducing light are moved toward the center of the spot in a forward portion in a direction, in which the reproducing light spot is moved, so that a recording magnetic domain is enlarged, and movement of the domain walls of the magnetic layer adjacent to the portion irradiated with reproducing light is inhibited in a rear portion in the direction in which the reproducing light spot is moved.

The movement of the domain walls of the magnetic layer adjacent to the portion irradiated with the reproducing light is inhibited in the rear portion in the direction in which the reproducing light spot is moved. Thus, the ghost phenomenon can be prevented.

To inhibit the movement of the domain walls of the magnetic layer adjacent to the portion irradiated with reproducing light, for example, insertion of a magnetic layer having a predetermined magnetic characteristic between the displacement layer and the switch layer is required. As a result, a ghost can be prevented while the characteristics of the DVDD are being maintained.

DESCRIPTION OF THE PREFERRED EMBODIMENTS

Referring to the drawings, an embodiment of the present invention will now be described.

Figure 1:
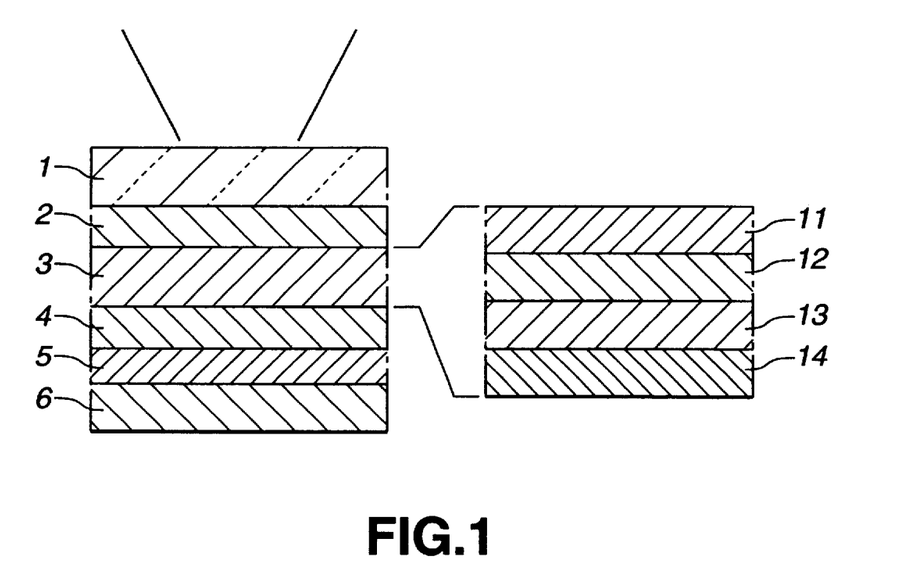
FIG. 1 is a schematic cross sectional view showing an essential portion of an example of the structure of a magneto-optical recording medium according to the present invention.

The basic structure of a magneto-optical recording medium according to the present invention is similar to a usual magneto-optical recording medium. As shown in FIG. 1, a dielectric film 2, a recording layer 3, a dielectric film 4, a reflecting film 5 and a protective film 6 are sequentially laminated on a transparent substrate 1.

The dielectric films 2 and 4 are made of, for example, silicon nitride, while the protective film 6 is made of, for example, ultraviolet-curing resin. The materials of the dielectric films 2 and 4 are not limited to the foregoing materials and, therefore, another dielectric material, such as silicon oxide or aluminum nitride, may be employed.

The reflecting film 5 made of aluminum or the like may be omitted.

Although the structure is constituted on a precondition that recording/reproducing light is applied from the portion adjacent to the transparent substrate 1, the structure may be constituted such that recording/reproducing light is applied from a portion adjacent to the protective film 6. In the foregoing case, the structure is different from the foregoing structure in that the position at which the reflecting film 5 is formed is between the dielectric film 2 and the transparent substrate 1. Moreover, the layer structure of the recording layer 3 to be described later is inverted.

Although the thickness of each layer may arbitrarily be determined, thicknesses are, for example, as follows: the thickness of the transparent substrate 1 is 700 Å, that of the dielectric film 4 is 500 Å and that of the reflecting film 5 is 300 Å.

On the other hand, the DWDD magneto-optical recording medium incorporates the recording layer 3 which is basically composed of three layers which are a displacement layer, a switch layer and a memory layer. In the present invention, the recording layer 3 has four magnetic layers because a fourth magnetic layer for inhibiting movement of the domain walls of the displacement layer is formed between the displacement layer and the switch layer.

That is, as shown in FIG. 1, four layers are laminated in an order from a portion on which reproducing light is made incident, the layers being a first magnetic layer (the displacement layer which is hereinafter called a "DS layer") 11, a second magnetic layer (the layer for inhibiting movement of the domain walls, which is hereinafter called a "YS layer") 12, a third magnetic layer (the switch layer which is hereinafter called a "SW layer") 13 and a fourth magnetic layer (the memory layer which is called a "MM layer") 14. Thus, the foregoing layers constitute the recording layer 3.

Characteristics which must be realized by each magnetic layer will now be described. The DS layer 11 must be capable of reproducing a satisfactorily intense signal at the temperature realized when reproduction is performed. Therefore, a high Curie temperature and a large Kerr rotational angle are required. At least the Curie temperature $T_{C1}$ must be higher than the Curie temperature $TC_{C3}$ of the SW layer 13.

When the switched connection with the SW layer 13 has been disconnected, easy movement of the domain walls is required. The coercive force of the domain walls must be small force. It is preferable that the coercive force of the domain walls is 1 kOe or smaller.

The thickness of the DS layer 11 is required to be not smaller than a thickness with which the Kerr rotational angle is saturated. The thickness must be 200 Å or larger, preferably 250 Å or larger. It is preferable that the thickness is 350 Å or smaller.

The material of the DS layer is exemplified by GdFeCo.

The DS layer may be constituted by a double-layered film consisting of two layers having different Curie temperatures and made of GdFeCo having a Curie temperature of 250° C. and GdFe having a Curie temperature of 210° C.

A triple-layered structure is permitted. In the foregoing cases, the layers are disposed in descending order of the Curie temperature from the portion on which reproducing light is made incident.

The SW layer 13 will now be described. The SW layer 13 interrupts the switched connection between the DS layer 11 and the MM layer 14 at a predetermined temperature. Therefore, the predetermined Curie temperature $T_{C3}$ which is the interrupting temperature is required.

The thickness is required to be a thickness with which the switching force can stably and uniformly be interrupted. It is preferable that the thickness is 50 Å or larger, more preferably 100 Å or larger. Since too large thickness of the SW layer 13 does not improve the effect, the upper limit is about 200 Å.

The material of the SW layer is exemplified by TbFe.

The MM layer 14 is a layer for holding the recording magnetic domains. Since the shape of a fine recording magnetic domain must stably be held when reproduction is performed, the Curie temperature $T_{C4}$ must be not lower than the Curie temperature $T_{C3}$ of the SW layer 13. To stably hold the fine recording magnetic domain, large coercive force and vertical magnetic anisotropy are required.

The material of the MM layer is exemplified by TbFeCo.

The present invention is characterized in that the YS layer 12 is inserted into a space between the DS layer 11 and the SW layer 13. The YS layer 12 has a function of inhibiting movement of the domain walls of the DS layer 11 in a direction toward the center of the spot at a position in a rear position in the direction in which the reproducing light spot is moved. Therefore, the coercive force of domain walls (the magnetic anisotropy) of the YS layer 12 must be larger than that of the DS layer 11. The Curie temperature $T_{C2}$ of the YS layer 12 must be a level between the Curie temperature $T_{C1}$, of the DS layer 11 and the Curie temperature $T_{C3}$ of the SW layer 13.

Since the YS layer 12 has the function to inhibit movement of the domain walls, it is preferable that the material of the YS layer 12 contains Tb. For example, the material is exemplified by TbFeCo.

The relationship of the characteristics of the foregoing magnetic layers are summarized as follows: as for the Curie temperature, an assumption is made that the Curie temperature of the DS layer 11 is $T_{C1}$, the Curie temperature of the YS layer 12 is $T_{C2}$, the Curie temperature of the SW layer 13 is $T_{C3}$ and the Curie temperature of the MM layer 14 is $T_{C4}$, the following relationship must be met:

$$T_{C1} > T_{C2} > T_{C3}$$

$$T_{C4} > T_{C3}$$

As for the magnetic anisotropy, assuming that the magnetic anisotropy of the DS layer 11 is $K_{U1}$ and the magnetic anisotropy of the YS layer 12 is $K_{U2}$, the following relationship must be met:

$$K_{U2} > K_{U1}$$

Table 1 shows an example of a specific structure of the recording layer 3.

TABLE 1

| | Material | Thickness | Curie Temperature | Coercive force | Magnetization | Energy of Domain Wall |
|---|---|---|---|---|---|---|
| DS Layer | GdFeCo | 250 Å | 250° C. | 400 (Oe) | 20 emu/cc | 1 erg/cm² |
| YS Layer | TbFeCo | 70 Å | 150° C. | 10 k (Oe) | 20 emu/cc | |
| SW Layer | TbFeAl | 150 Å | 120° C. | | | |
| MM Layer | TbFeCo | 300 Å | 240° C. | 15 k (Oe) | 20 emu/cc | |

A signal reproducing operation of the magneto-optical recording medium according to the present invention is described below.

Initially, the basic operation of the DWDD magneto-optical recording medium such that is described below to explain the triple-layer structure consisting of the DS layer 11, the SW layer 13 and the MM layer 14.

Figure 2:
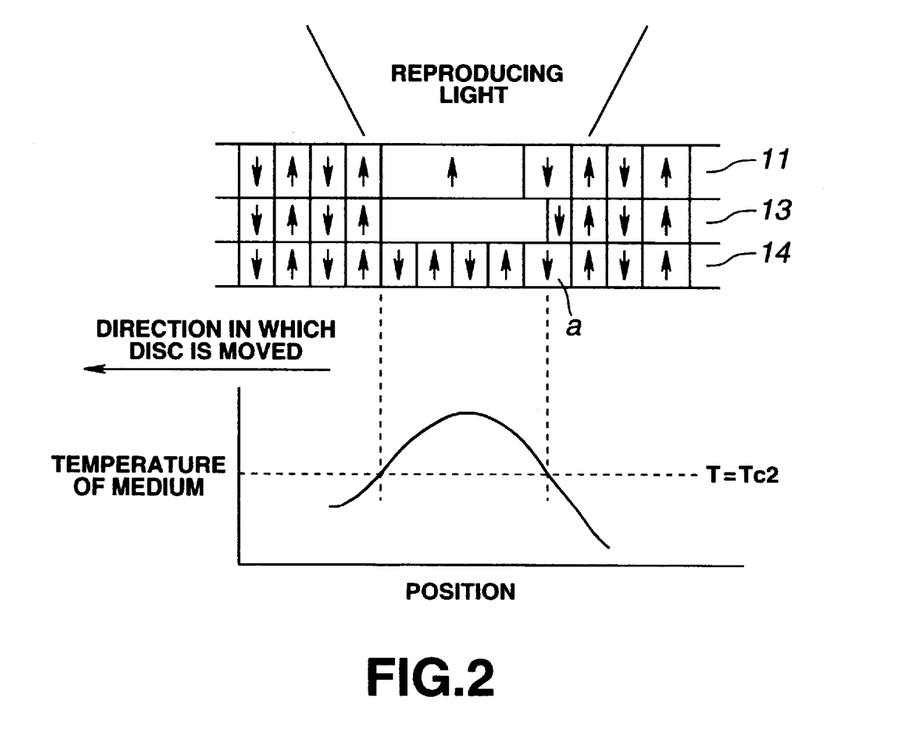
FIG. 2 is a schematic view showing a state of a recording magnetic domain and a temperature profile of the medium to illustrate an operation for moving domain walls of an optical disc having a triple-layered structure.

The magneto-optical recording medium according to this embodiment incorporates the three magnetic layers (the DS layer 11, the SW layer 13 and the MM layer 14) all of which are vertically magnetized films at the reproducing temperature. At least, the magnetization of each layer aligns vertically with respect to the surface of the film at the reproducing temperature, as shown in FIG. 2. Note that the DS layer 11 and the SW layer 13 are not required to be the vertically magnetized films at room temperature. The foregoing layers may be in-plane magnetic films.

Similarly to the following drawings, FIG. 2 shows arrows which indicate spinning directions (directions in which, for example, Fe or Co, which are transition metal, are magnetized) of each magnetic layer.

For example, a switched connection is exerted on the space between the foregoing layers, and the spinning directions are aligned in a usual state.

In this embodiment, an assumption is made that the medium is a disc-shape medium. When the disc is rotated, the medium is moved to the left in the drawing during a reproducing operation. The recording operation is performed by a light modulation recording method or a magnetic-field modulation recording method which are employed in a usual magneto-optical recording operation.

Recording is mainly performed by using the MM layer 14. The spinning direction of the MM layer 14 is transferred to the SW layer 13 and the DS layer 11 so that recording is completed. For example, a recording magnetic domain a of the MM layer 14 is transferred to the DS layer 11. Thus, a recording magnetic domain A is formed on the DS layer 11.

When reproducing is performed, the temperature of each magnetic layer is raised due to irradiation with reproducing light. The Curie temperature $T_{C3}$ of the SW layer 13 among the three magnetic layers is set to be the lowest temperature. As shown in FIG. 2, the rise in the temperature occurring due to the irradiation of reproducing light causes the magnetization of the SW layer 13 to disappear in a region higher than the Curie temperature $T_{C3}$. Regions in which the temperature T is raised to a level higher than Curie temperature $T_{C3}$ and the magnetization of the SW layer 13 has disappeared are indicated with blank regions.

In a region of the SW layer 13, the temperature of which has been raised to a level not lower than the Curie temperature $T_{C3}$, the switched connection between the MM layer 14 and the DS layer 11 does not act.

The MM layer 14 is made of the magnetic material, for example, TbFeCo, having great magnetic anisotropy and coercive force. Therefore, if the switched connection with another magnetic layer disappears, a recording state is not changed.

Figure 3:
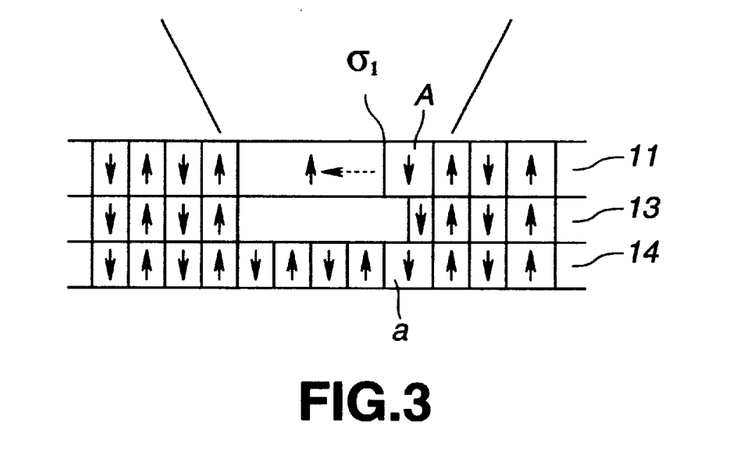
FIG. 3 is a schematic view showing a state of movement of the domain walls.

On the other hand, the DS layer 11 is, conversely to the MM layer 14, made of a material, for example, GdFeCo having small magnetic anisotropy and relatively small coercive force and facilitating movement of the domain walls which are formed around the recording magnetic domain. Therefore, when the switched connection with the MM layer 14 has disappear, the domain walls $\sigma_1$, of the DS layer 11 are, at a forward position in a direction in which the reproducing light spot is moved, moved in a direction in which the magnetic energy is reduced, as shown in FIG. 3. When the domain walls $\sigma_1$ is moved to the left, the energy is reduced.

Figure 4:
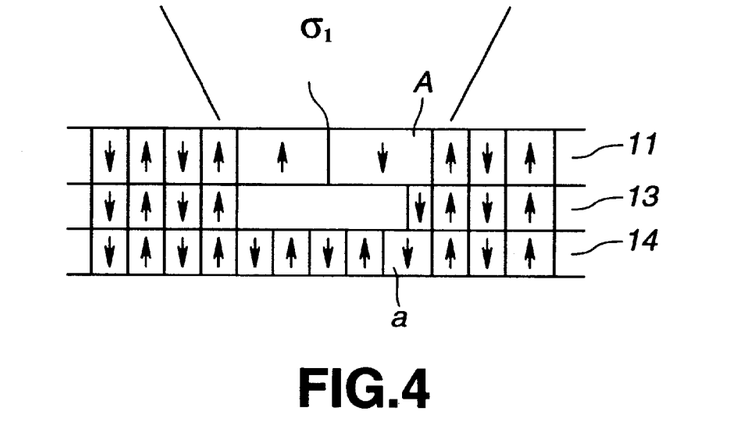
FIG. 4 is a schematic view showing a stable state of the domain walls.

A state in which the domain walls cl have been moved is shown in FIG. 4. When the domain walls $\sigma_1$ in the DS layer 11 have been moved, the recording magnetic domain A of the DS layer 11 corresponding to the recording magnetic domain a of the MM layer 14 is enlarged. As a result, a large reproduction carrier signal can be obtained.

As the magnetic energy, energy $\sigma_w$ of domain walls is considered. An assumption is made that the magnetization of the DS layer 11 is very small, also the applied external magnetic field is small and, therefore, the magnetostatic energy is very small.

In general, the energy $\sigma_{W1}$ of domain walls of the DS layer 11 is expressed as follows when the switch stiffness is constant $A_1$ and the magnetic anisotropy is constant $K_{u1}$:

$$\sigma_{W1} = 4\sqrt{A_1 K_{U1}}$$

Both the switch stiffness constant $A_1$ and magnetic anisotropy constant $K_{U1}$ are functions of temperature. When the temperature is raised, each constant is monotonously reduced. When the temperature reaches the Curie temperature, each constant is made to be zero. Therefore, when the domain walls are positioned at the position of the highest temperature, the most stable state can be realized from a viewpoint of energy. It leads to a fact that the domain walls $\sigma_1$ move to the left in the drawing.

Since the diameter of the recording magnetic domain is smaller than the minimum diameter of the stable magnetic domain of the DS layer 11 as described later, the position to which the domain walls are moved or also the value of the energy of the domain walls is different from the value obtainable from the foregoing general equation.

The diameter $L_{min}$ of stable recording magnetic domain of only the DS layer 11 in a case of GdFe (saturated magnetization $M_{S1}$, and coercive force $H_{Cl}$) is estimated as follows:

$$L_{min} = \sigma_{W1}/M_{S1} \cdot H_{C1} \approx 1 \ \mu m$$

$$(\sigma_{W1} = 1 \times 10^{-3} J/m^2, M_{S1} \cdot H_{C1} = 10^3 J/m^3)$$

On the other hand, the size of the recording magnetic domain shown in the drawing is sometimes 0.05 $\mu$m or greater and 1 $\mu$m or smaller when, for example, the wavelength is 640 nm and the numerical aperture of the objective lens satisfies NA=0.55. In the foregoing case, a size not smaller than 1 $\mu$m is magnetically stable when the switched connection from another layer is cut in a portion of the DS layer 11. Therefore, a consideration can be made that the magnetic domain is enlarged simultaneously with the cut of the switched connection at the left-hand position of the domain walls. Thus, the domain walls are moved to a magnetically stable place. To obtain greater signal at this time, it is preferable that $\sigma_{W1}/M_{S1 \cdot HC1}$ is small.

Figure 5:
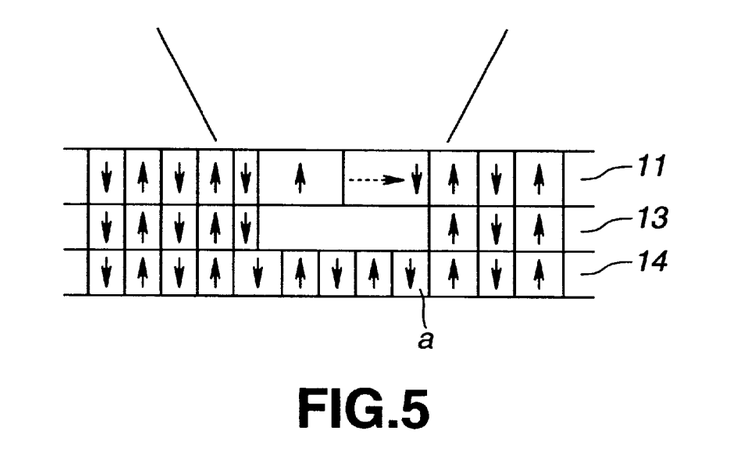
FIG. 5 is schematic view showing a state in which the domain walls have disappeared.
Figure 6:
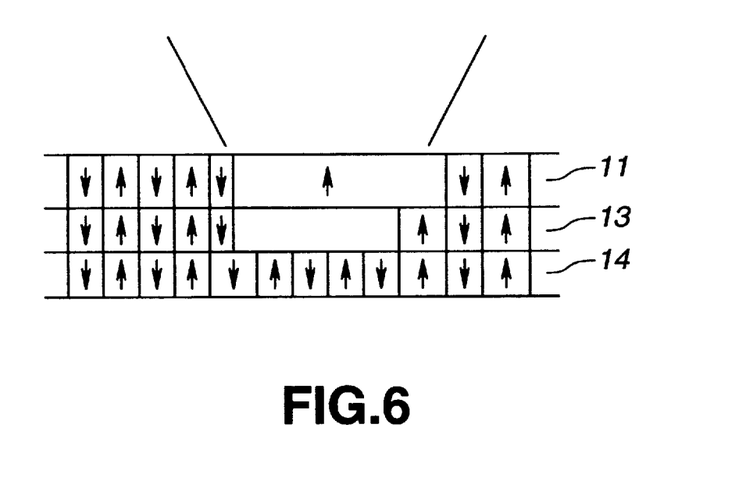
FIG. 6 is a schematic view showing a state of movement of the domain walls to illustrate an operation for moving the domain walls in an isolated recording magnetic domain.
Figure 7:
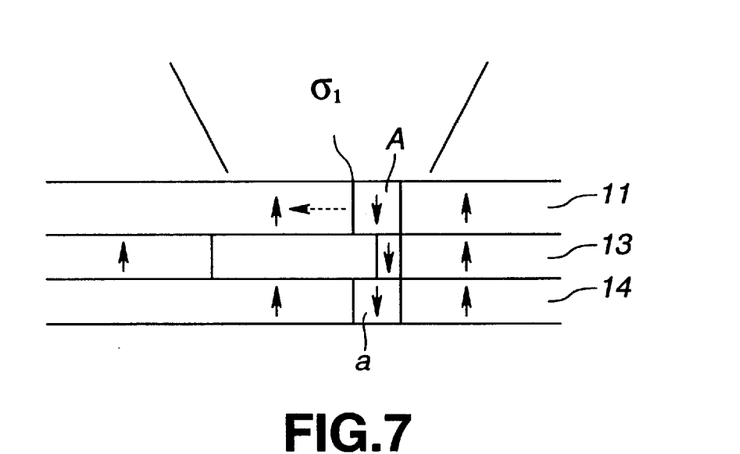
FIG. 7 is a schematic view showing a stable state of the domain walls.
Figure 8:
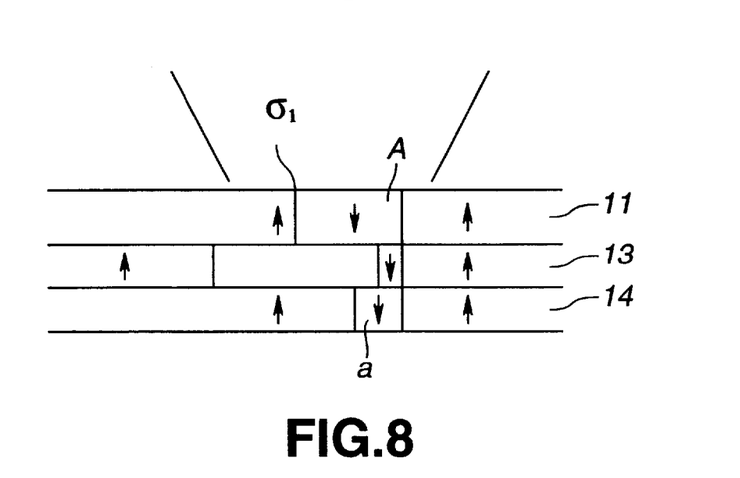
FIG. 8 is a schematic view showing a state in which the domain walls have disappeared.
Figure 9:
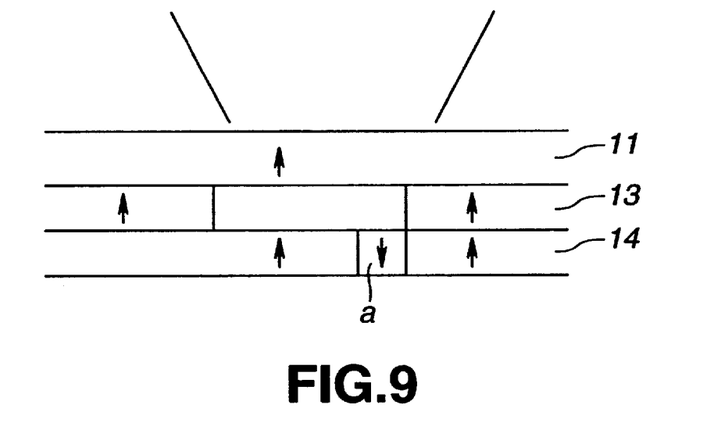
FIG. 9 is a schematic view showing transference of the recording magnetic domain at a position in the rear of a reproducing light spot.

When the switched connection between the recording magnetic domain a of the MM layer 14 and the SW layer 13 has completely been disconnected as shown in FIG. 5, the domain walls $\sigma_l$ are moved in a case where the size of the recording magnetic domain of the DS layer 11 is smaller than the magnetic domain which can solely and stably exist in the DS layer 11 as described above. Therefore, as shown in FIG. 6, the magnetic domain A disappears.

As a result of the sequential movement operation of the domain walls as shown in FIGS. 2 to 6, a signal can be reproduced from a small magnetic domain which cannot be reproduced by a usual optical system or a magnetic domain having a short period.

The foregoing DWDD method encounters movement of the domain walls called a ghost when the period P of the recording magnetic domain is large (P/2 $\geq \sigma_D$: width of domain wall). The movement of the domain walls takes place at a position in the rear of the reproducing light spot. Conversely to the movement in a forward position of the reproducing light spot, the movement takes place from a position in the rear of the reproducing light spot toward the center of the spot.

The mechanism of occurrence of the ghost will now be described with reference to FIGS. 7 to 13. An illustrative example is taken in which a very small and isolated recording magnetic domain a exists to describe the movement of the domain walls during a reproducing operation.

A usual operation for enlarging the recording magnetic domain (FIGS. 7 to 9) is similar to that described with reference to FIGS. 2 to 6. Therefore, the usual operation is omitted from the description below.

Figure 10:
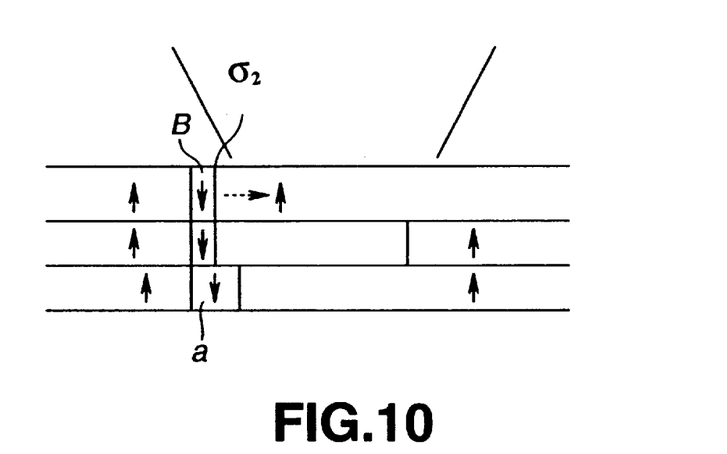
FIG. 10 is a schematic view showing movement of the domain walls which causes a ghost.

After enlargement and reproduction of the recording magnetic domain a have been completed, the disc is rotated. Thus, the left-hand end of the recording magnetic domain a passes through a right-hand position of the blank region of the SW layer 13. As a result, as shown in FIG. 10, the temperature is lowered so that spins in the same direction as that of the recording magnetic domain a of the MM layer 14 occur in the SW layer 13. Moreover, the switched connection from the SW layer 13 to the DS layer 11 causes spins in the same direction to occur in the DS layer 11. As a result, a recording magnetic domain B is formed and, new domain walls $\sigma_2$ exist in the DS layer 11.

Figure 11:
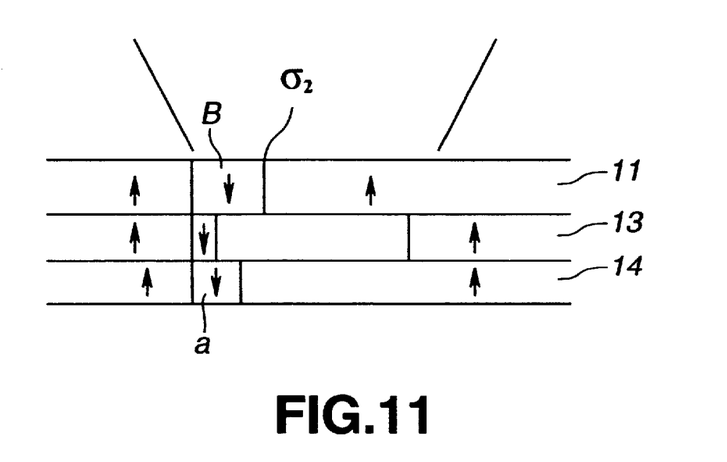
FIG. 11 is a schematic view showing a stable state of the domain walls which cause a ghost.

Also the generated domain walls of, move to the position at which the magnetic energy is minimized. Also the foregoing movement takes place in a direction toward high temperatures or in a direction in which the recording magnetic domain B is enlarged. As shown in FIG. 11, the domain walls $\sigma_2$ are moved toward the center of the spot, and the recording magnetic domain B of the DS layer 11 is enlarged.

Figure 12:
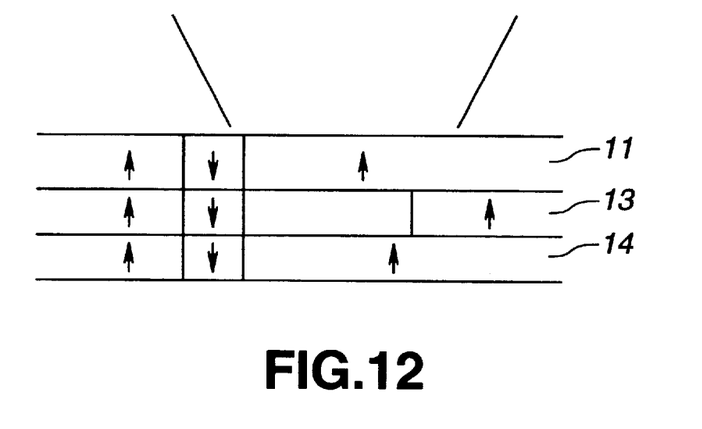
FIG. 12 is a schematic view showing a state in which a state before reproduction has been restored.

When the disc has furthermore been moved until the switched connection acts on all of the isolated recording magnetic domains as shown in FIG. 12, the domain walls $\sigma_2$ are again moved and, therefore, the state before the reproduction is restored.

Therefore, when an isolated recording magnetic domain is reproduced, the domain walls are initially moved to the left in the drawing. Thus, the recording magnetic domain is enlarged so that an intense signal appears. Then, the magnetic domain of the DS layer 11 disappear so that the level of the signal is made to be zero. Then, a signal caused from the movement of the domain walls to the right again appears, and then disappears. Change of the signals occurring as time elapses is shown in FIG. 13.

Figure 13:
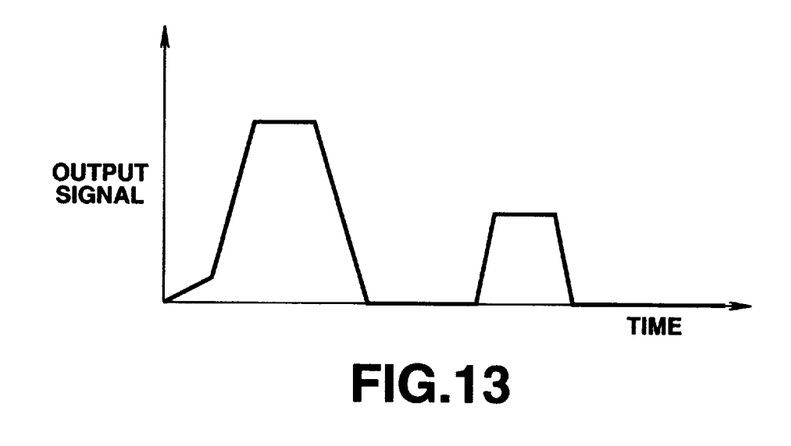
FIG. 13 is a characteristic graph showing a signal obtainable from a sequential operation for moving the domain walls.

When the changes in the signals shown in FIG. 13 are considered, it is very difficult to distinguish the fact that a signal which appears second is caused from the foregoing ghost phenomenon or caused from a recording magnetic domain recorded next. Therefore, a reproduction error occurs.

There is the possibility that the ghost phenomenon occurs also in a recording state shown in FIG. 2. To enable the movement of the domain walls, the switched connection region in the DS layer 11 has a certain length (about a length not shorter than the width of the domain wall). If the period of the recording magnetic domain is short, the foregoing length cannot be obtained. Therefore, the ghost does not appear.

To prevent the ghost phenomenon, the present invention is structured such that the YS layer 12 is inserted between the DS layer 11 and the SW layer 13. The characteristics (the Curie temperature and the magnetic anisotropy) of the YS layer 12 are as described above.

Then, the mechanism for preventing the ghost phenomenon owning to the insertion of the YS layer 12 will now be described.

A sequential operation for moving the domain walls in the magneto-optical recording medium having a four-layered structure constituted by inserting the YS layer 12 is shown in FIGS. 14 to 18.

Also in the foregoing case, the usual operation (FIGS. 14 to 16) for enlarging the recording magnetic domain is similar to that described with reference to FIGS. 2 to 6. Therefore, the usual operation is omitted from the description. In the magneto-optical recording medium having the triple-layered structure, the domain walls of the DS layer 11 are moved in a region in which the temperature has been raised to a level not lower than the Curie temperature $T_{C3}$ of the SW layer 13. On the other hand, the domain walls of the DS layer 11 are moved in a region in which the temperature has been raised to a level not lower than the Curie temperature $T_{C2}$.

Figure 14:
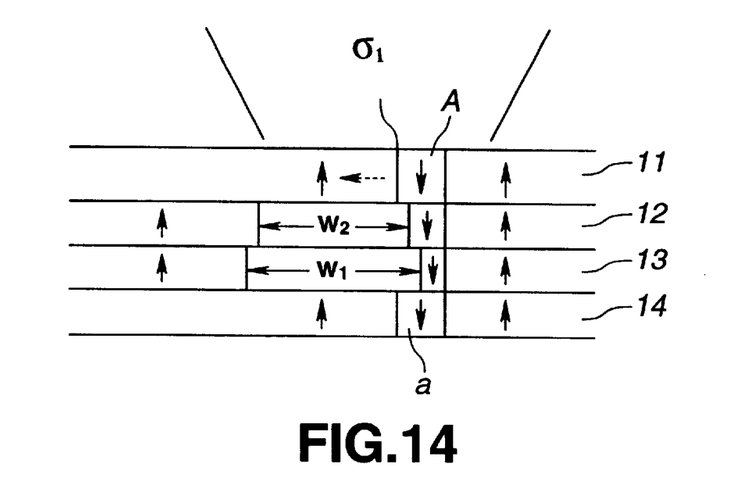
FIG. 14 is a schematic view showing a state in which the domain walls are moved to illustrate the operation for moving the domain walls in an optical disc having a four-layered structure optical disc.
Figure 15:
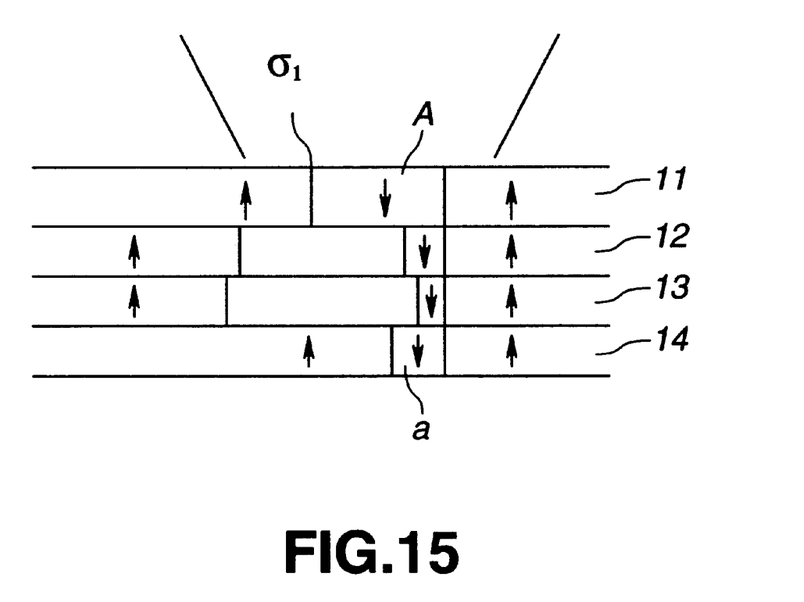
FIG. 15 a schematic view showing a stable state of the domain walls.
Figure 16:
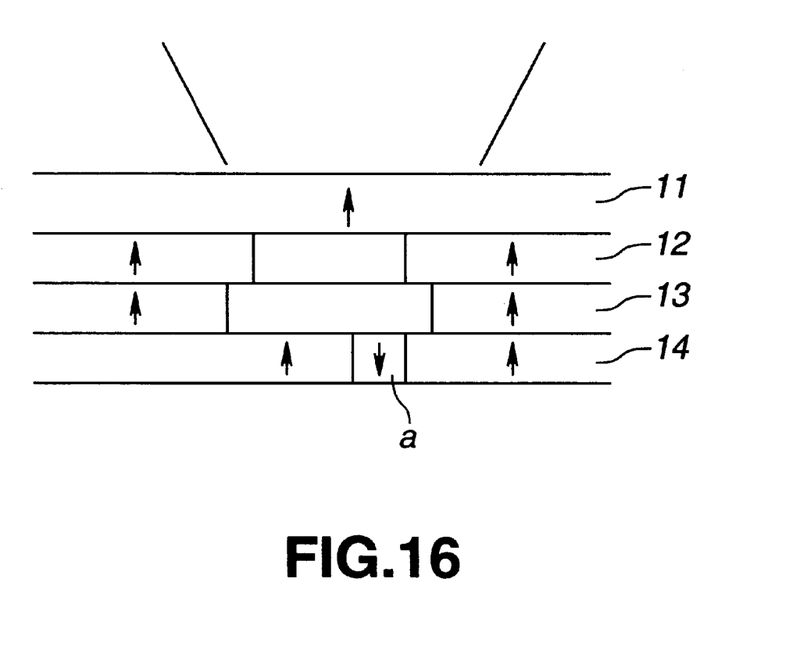
FIG. 16 is a schematic view showing a state in which the domain walls have disappeared.

In the region of the SW layer 13, the temperature of which is not lower than the Curie temperature $T_{C3}$, the switched connection between the SW layer 13 and the YS layer 12 disappears. However, the magnetic anisotropy of the YS layer 12 is greater than that of the DS layer 11. Namely, the coercive force of the YS layer 12 is large and, therefore, the domain walls can easily be moved. Therefore, the domain walls are not moved in the above-mentioned temperature range.

The YS layer 12 is magnetized at a rear position in the direction in which the reproducing light spot is moved and at which the temperature is raised to the Curie temperature $T_{C2}$ of the YS layer 12. Since only the switched connection from the DS layer 11 acts at the foregoing temperature, the spinning directions of the YS layer 12 align to the direction of the DS layer 11. The foregoing state is a state in which no domain wall exists in the DS layer 11.

Figure 17:
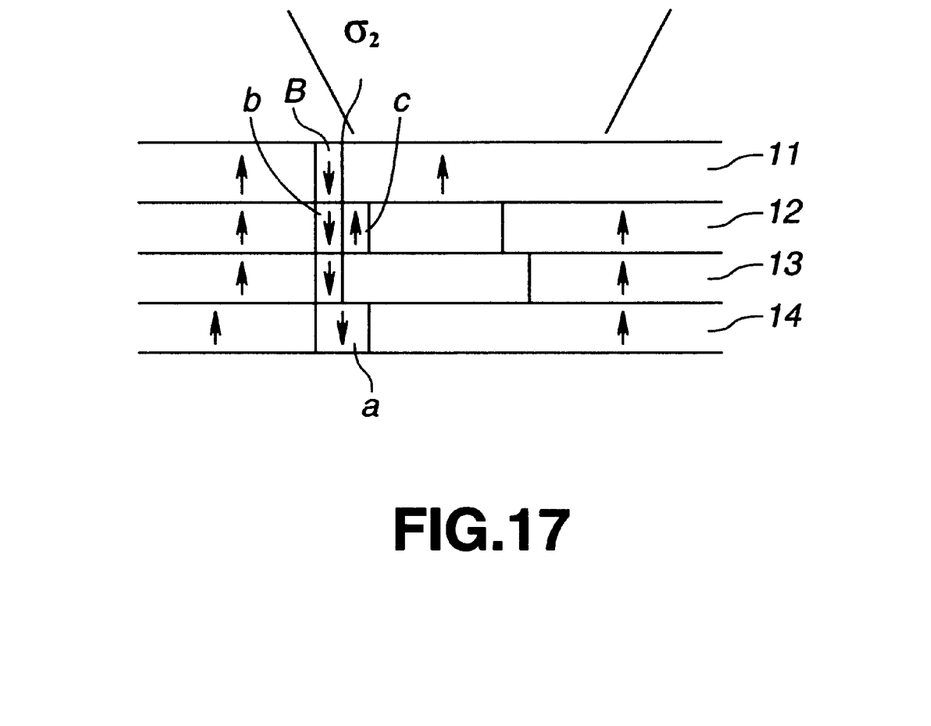
FIG. 17 is a schematic view showing transference of a recording magnetic domain at a position in the rear of the reproducing light spot.

When the disc has furthermore been moved and, therefore, the temperature has been lowered to the Curie temperature $T_{C3}$ of the SW layer 13, the SW layer 13 is magnetized, as shown in FIG. 17.

The switched connection force is exerted on the SW layer 13 from the YS layer 12 and the MM layer 14. The latter influence is greater at a position immediately above the recording magnetic domain a of the MM layer 14. In the foregoing portion, the spins of the SW layer 13 align to the direction of the recording magnetic domain a of the MM layer 14. Moreover, the switched connection causes the aligned spins to the YS layer 12 and the DS layer 11. Thus, a recording magnetic domain b is formed in the YS layer 12 by transference and a recording magnetic domain B is formed in the DS layer 11 by transference. Therefore, domain walls $\sigma_2$ are formed in the DS layer 11.

Hitherto, the domain walls have been moved to cause a ghost signal to be produced. Since the YS layer 12 is provided in the present invention, the movement of the domain walls can be inhibited, thus preventing a ghost signal.

That is, when the recording magnetic domain b has been formed on the YS layer 12, a region c with which the switched connection is established with the DS layer 11 is left in the right-hand portion of the recording magnetic domain b. The region c has spins in a direction opposite to those in the recording magnetic domain B of the DS layer 11. As a result of the switched connection force, the directions of the spins of the DS layer 11 cannot be made to be the same as those in the recording magnetic domain B.

Figure 18:
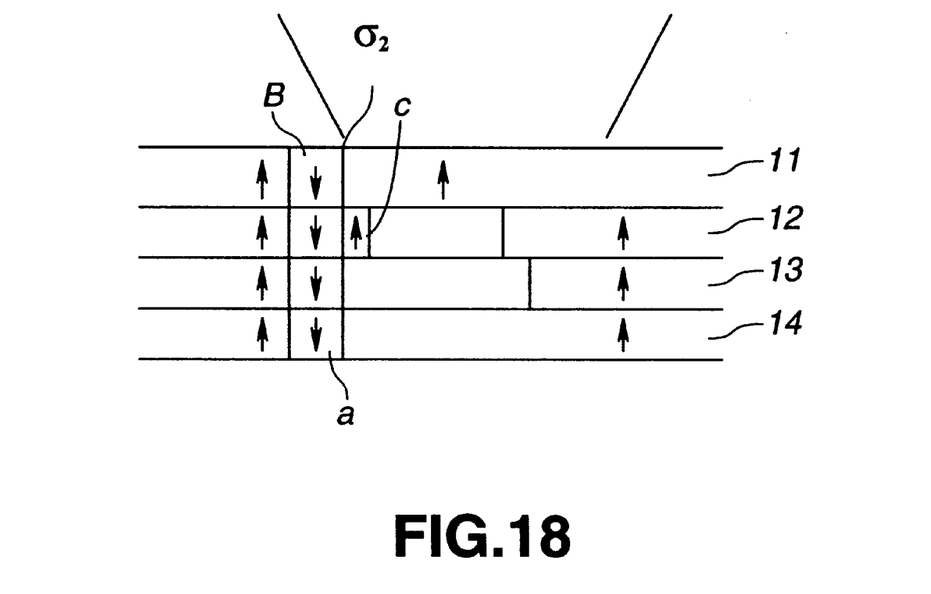
FIG. 18 is a schematic view showing a state in which a state before reproduction has been restored.

The foregoing state is continued until the switched connection acts on all of the isolated recording magnetic domains and, thus, a state before the reproduction is realized, as shown in FIG. 18.

Therefore, the domain walls of the DS layer 11 cannot be moved. The four-layered structure is able to prevent occurrence of a ghost when reproduction is performed.

The above-described recording medium and signal reproducing method is illustrative of the principles of the present invention. Numerous modifications and adaptions thereof will be readily apparent to those skilled in this art without departing from the spirit and scope of the present invention.

What is claimed is:

1. A magneto-optical recording medium comprising:
   a recording layer including a multi-layer magnetic film having a four-layered structure comprising a first magnetic displacement layer, a second magnetic domain wall movement inhibiting layer, a third magnetic switch layer, and a fourth magnetic memory layer formed in this order from a portion which is irradiated with a reproducing light;
   when a Curie temperature of said first magnetic layer is defined as $T_{C1}$, a Curie temperature of said second magnetic layer is defined as $T_{C2}$, a Curie temperature of said third magnetic layer is defined as $T_{C3}$, and, a Curie temperature of said fourth magnetic layer is defined as $T_{C4}$, the following relationship is met:

$T_{C1} > T_{C2} > T_{C3}$, $T_{C4} > T_{C3}$;

and
   When a magnetic anisotropy of said first magnetic layer is defined as $K_{U1}$ and a magnetic anisotropy of said second magnetic layer is defined as $K_{U2}$, the following relationship is met:

$K_{U2} > K_{U1}$.

2. A magneto-optical recording medium according to claim 1, wherein said second magnetic layer contains Tb.

3. A signal reproducing method for reproducing a signal by irradiating, with reproducing light, a magneto-optical recording medium incorporating a recording layer including a multi-layered magnetic film of said magneto having a four-layered structure comprising a first magnetic displacement layer, a second magnetic domain wall movement inhibiting layer, a third magnetic switch layer, and a fourth magnetic memory layer formed in this order from a portion which is irradiated with a reproducing light;
   when a Curie temperature of said first magnetic layer is defined as $T_{C1}$, a Curie temperature of said second magnetic layer is defined as $T_{C2}$, a Curie temperature of said third magnetic layer is defined as $T_{C3}$:, and, a Curie temperature of said fourth magnetic layer is defined as $T_{C4}$, the following relationship is met:

$T_{C1} > T_{C2} > T_{C3}$, $T_{C4} > T_{C3}$ and
   when a magnetic anistropy of said first magnetic layer is defined as $K_{U1}$ and magnetic anisotropy of said second magnetic layer is defined as $k_{U2}$, the following relationship is met:

$K_{U2} > K_{U1}$.

4. A signal reproducing method according to claim 3, wherein said second magnetic layer contains Tb.

* * * * *